United States Patent [19]
Rogers

[11] 3,889,761
[45] June 17, 1975

[54] DEEP-TINE AERATING MACHINE

[75] Inventor: Roy H. Rogers, Tucson, Ariz.

[73] Assignee: R & R Products, Inc., Tucson, Ariz.

[22] Filed: Apr. 4, 1974

[21] Appl. No.: 457,916

[52] U.S. Cl................................. 172/706; 172/765
[51] Int. Cl............................................. A01b 15/00
[58] Field of Search ....... 172/22, 21, 713, 705, 706, 172/714, 762, 542, 543, 544; 111/89, 99, 111/685; 56/400

[56] References Cited
UNITED STATES PATENTS
| | | | |
|---|---|---|---|
| 2,515,351 | 7/1950 | Loucks | 111/89 |
| 2,800,066 | 7/1957 | Cohrs et al. | 172/22 |

Primary Examiner—Stephen C. Pellegrino
Attorney, Agent, or Firm—Warren F. B. Lindsley

[57] ABSTRACT

A deep-tine vehicle mounted aerating machine employing a plurality of spaced split tines that function to aerate the soil of a golf course green or the like.

5 Claims, 8 Drawing Figures

PATENTED JUN 17 1975

SHEET 1

3,889,761

DEEP-TINE AERATING MACHINE

BACKGROUND OF THE INVENTION

This invention pertains to power operated deep-tine aerating devices.

FIELD OF THE INVENTION

This invention is particularly directed to power operated aerating devices which employ a plurality of tines in association with suitable apparatus to deeply penetrate the turf and soil surface of a golf course green or the like which, when subsequently lifted from the turf and the soil, leave a plurality of deep apertures in the same for the purpose of aeration.

DESCRIPTION OF THE PRIOR ART

Many types of devices have been utilized in the past for the purpose of aerating golf course greens. Most of these devices use a heavy weighted member having a plurality of sharp, pointed, depending spikes or tines attached to their undersides which are driven through the turf into the top surface of the soil and then subsequently lifted from the lawn surface to provide a plurality of aerating apertures in the soil to aid and encourage continued propagation of the grass.

These devices can be simple weighted tampers lifted manually and dropped to provide the desired apertures in the soil of the lawn, or complicated and expensive power operated machines that operate on the same principle as a pile driven or drop hammer to obtain similar results. The desired end result of utilizing such devices is to provide a plurality of equally spaced, clean-cut, deep apertures throughout the entire surface of the lawn and to discharge and distribute any soil that may be picked up by the spikes or tines during the lifting and removal of the same from the apertures thus formed.

The end result described above is entirely dependent on the type of spike or tine utilized to form the apertures in the soil and the accurate controlled movement of the device over the area of the lawn being operated on. It is therefore evident that if solid metal tapered tines or hollow metal tapered tines having open ends were utilized, neither type would accomplish the desired end results. The solid tine would compact the soil adjacent each aperture as it penetrated the lawn and would remove little or no soil from the apertures. The hollow metal tapered type tine would penetrate the soil more deeply with greater ease than the solid metal one and would cause the soil from the apertures to be formed up into the hollow interiors of the tines during their ground penetrating stroke. These hollow, open-ended, tapered metal tines cut a deep, clean aperture in the soil and lift the soil from the apertures in their hollow interiors, but it is difficult to extract the soil from their hollow interiors onto the surface of the green on the retrieving stroke of the tines. This difficulty occurs because the tapered bore of the tines is of a smaller diameter at their outlet ends, causing any proposed use of a push rod to compress the soil within the bore to such an extent as to block its exit from the outlet ends of the tines. This action would cause an uneven distribution of the soil over the surface of the lawn and could exert enough outward radial pressure in the tapered bores of the tines to split the tines, bend the rods and render them and the machine useless until expensive replacement of these damaged tines has been accomplished.

Accordingly, a new and improved deep-tine aerating machine is needed which utilizes a plurality of two-piece, adjustable split tines to quickly and thoroughly perform the aerating function.

SUMMARY OF THE INVENTION

It is therefore the principle object of this invention to proivde a deep-tine aerating machine which employs a plurality of two-piece, adjustable split tines in association with a weighted drop box to aerate a golf course green or the like.

Another object of this invention is to provide a vehicle-mounted deep-tine aerating device operated by the vehicle power source employing a plurality of split tines removably attached to the underside of a weighted drop box for penetrating the turf and soil surface of a lawn upon each downward stroke of the drop box and dispersing soil picked up from the apertures so formed over the surface of the green upon each upward stroke of the drop box.

A further object of this invention is to provide a vehicle-mounted deep-tine aerating machine which is automatically caused to move a predetermined distance forward on the surface of the lawn upon each upward stroke of a weighted drop box so as to create a continuous pattern of equally spaced apertures in the turf and surface soil of the lawn.

Further objects and advantages of the invention will become apparent as the following description proceeds and the features of novelty which characterize this invention will be pointed out with particularity in the claims annexed to and forming a part of this specification.

DESCRIPTION OF THE PREFERRED EMBODIMENT

Figures 1, 2:
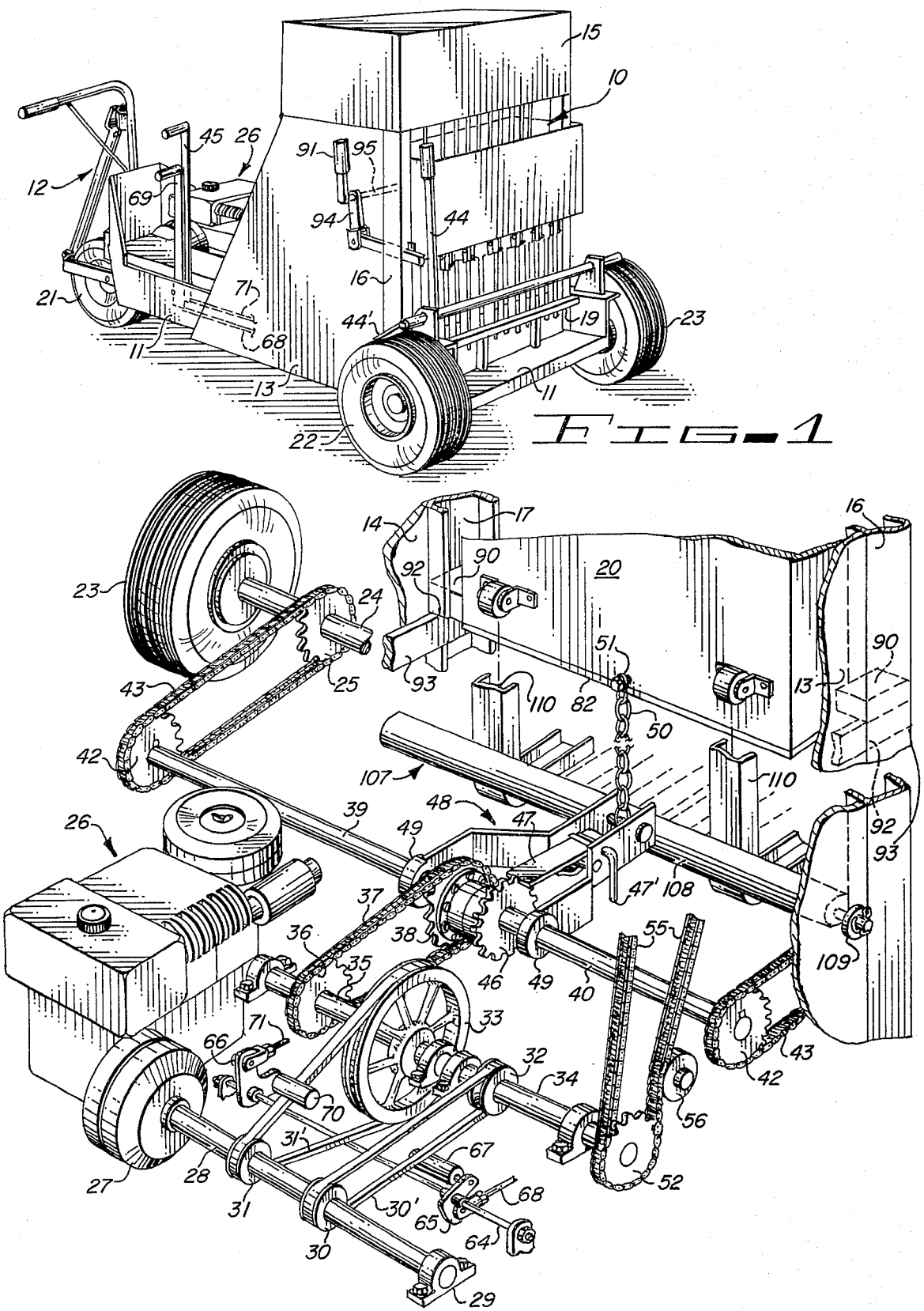
FIG. 1 is a perspective view of a three-wheeled motor vehicle having mounted on it the deep-tine aerating device of this invention.
FIG. 2 is a schematic perspective view of the structure shown in FIG. 1 looking from the left front side of the vehicle and illustrating the major operating components of the deep-tine aerating device and their relationship to the common power source of the vehicle.

Referring more particularly to the drawings by characters of reference, FIG. 1 illustrates the relationship of a deep-tine aerating machine or device 10 on the frame 11 of a three-wheeled, power driven vehicle 12. Vertical side walls 13 and 14 of vehicle 12 partially enclose a hinged box-like structure 15 and support channel members 16 and 17 which are aligned and rigidly secured to the rear end of the vehicle frame. These channel members are maintained in parallel relation by means of upper and lower transverse tie members 18 and 19, respectively. The vertical aligned channel members 16 and 17 serve to guide the heavy weighted drop box 20 during its up and down reciprocating movement between the same.

The power driven vehicle 12 is provided with the usual front, steerable ground wheel 21 and a pair of driven ground wheels 22 and 23 supported on and keyed to rotatable stub shafts 24 which are journaled in suitable bearings (not shown) on the side rails of the vehicle frame. The rotatable stub shafts 24 are each provided with sprocket wheels 25 which are keyed to shafts 24 and thus adapted to rotate the ground wheels 22 and 23 to drive the vehicle forward by means of a power train including a gas engine or motor 26 having a transmission (not shown) and a clutch member 27. Clutch member 27 is engaged in driving relationship with a drive shaft 28 to rotate it in either direction. As noted from the drawings, shaft 28 extends transversely across the vehicle frame where its free end is journaled in a bearing 29 secured to one of the side rails of frame 11.

Drive shaft 28 is provided with a pair of small pulley wheels 30 and 31 keyed thereto for rotation therewith and through V-belts 30' and 31' supplying a rotational movement or driving force to either a large pulley wheel 33 or a small pulley wheel 32. Pulley wheels 32 and 33 are keyed to the respective halves 34 and 35 of a two-piece aligned split shaft, each half of which is journaled in intermediate end bearings mounted on the vehicle frame.

The small pulley 31 on drive shaft 28 is connected in driving relationship to the large pulley 33 on the right half 35 of the split shaft V-belt 31'. This connection provides for rotational movement of that portion of shaft 35 associated with a sprocket wheel 36 fixed thereto. A drive chain 37 is connected in driving relationship with sprocket wheel 36 and with another sprocket wheel 38 of the same size keyed to the right-hand portion 39 of a transversely mounted, two-part rotatable shaft which includes a left-hand portion 40 shown in FIG. 2. These shaft portions are interconnected by a differential gear arrangement 41 which joins the inner ends of the separate shaft portions so that they may rotate at different speeds when the vehicle is turning corners.

The right and left-hand portions 39 and 40 of the twopart shaft are each provided at their outer ends with fixed sprocket wheels 42. These wheels are connected in driving relationship to the sprocket wheels 25 fixed to the stud shafts of the ground wheels 22 and 23 through drive chains 43 to impart rotational movement to the ground wheels when the power train is activated by a brake control lever 44 and a transport control lever 45.

The left-hand portion 40 of the two-part shaft is provided at its inner end adjacent differential gear 41 and approximately on the longitudinal centerline of the vehicle frame 11, with a deep-toothed sprocket gear 46. Gear 46 is fixed to this portion of the shaft in direct alignment with a pawl member 47 with which the teeth of the gear are adapted to contact and engage at certain times. Pawl member 47 is pivotally connected between the sides of a ratchet assembly 48. Two forward facing legs of the ratchet assembly are pivotally supported at 49 on the right- and left-hand portions 39 and 40 of the two-part shaft to provide for upward and downward radial movement of the ratchet device assembly 48 about the shafts 39 and 40 and to control this movement. A link chain 50 of a predetermined length is attached to the rear end channel portion of the ratchet device assembly and to the heavy weighted drop box 20 by stud 51 which is secured in the drop box near its bottom along its transverse centerline.

As mentioned, the connection of the small pulley 30 to the drive shaft 28 and small pulley 32 to the left half portion 34 of the split shaft provides for rotation of that portion of the shaft when activated through V-belt 30' as well as sprocket wheel 52 fixed to the outer end of shaft portion 34. Sprocket wheel 52 is connected in driving relationship to a larger sprocket wheel 53 shown in FIG. 3 which is fixed to and adjacent the left end of a transverse, rotatable shaft 54. Shaft 54 journaled in suitable bearings is secured to some part of the vehicle frame structure directly above and to the rear of the weighted drop box 20 and the vertical channel members 16 and 17 in which it is guided.

Figure 3:
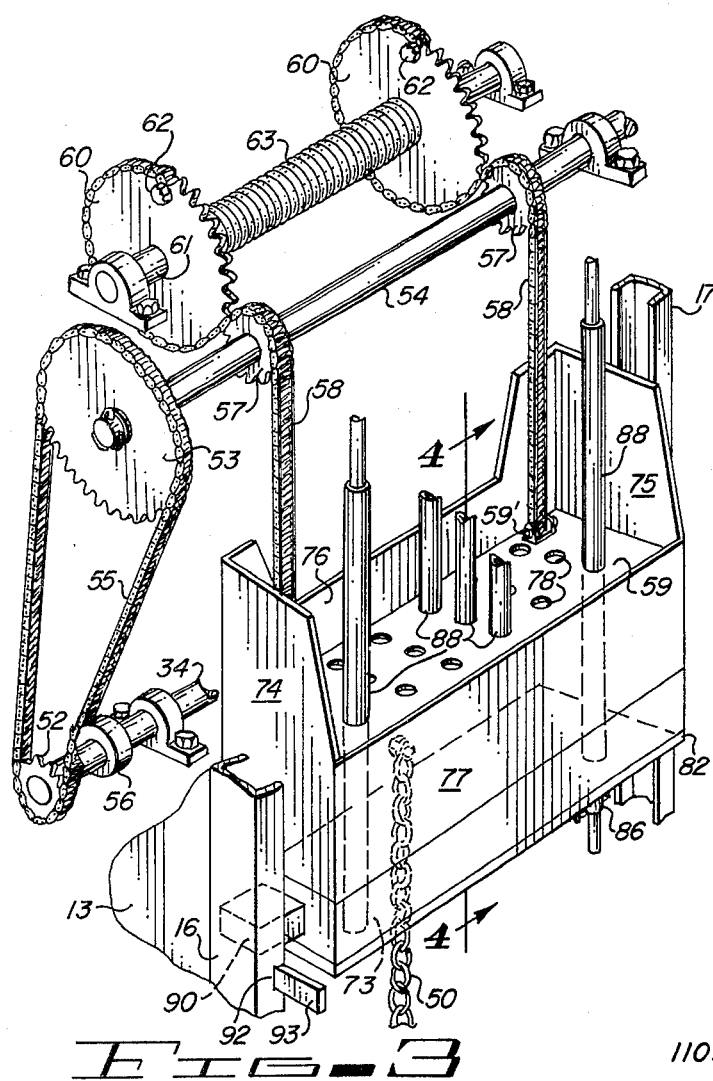
FIG. 3 is a fragmentary perspective view of the structure shown in FIG. 1 looking from the rear left side of the vehicle showing the weighted drop box of the aerating device in its uppermost retained position with its associated operating components for dropping and lifting the same.

The small sprocket wheel 52 and the large sprocket wheel 53 are loosely connected in driving relationship by a drive chain 55 which may be tightened to provide forced rotation of the shaft 54 when required by means of a chain tightening roller 56 shown in FIG. 2. Fixed to shaft 54 are a pair of identical small sprocket wheels 57 over which a pair of equal length lefting chains 58 are adapted to ride. The lower end of each of the lifting chains is secured to the top cover plate 59 of the weighted drop box 20 at 59'. Their upper ends which partially surround a pair of large sprocket wheels 60 fixed to the auxiliary transverse shaft 61 mounted above, to the rear and parallel with transverse shaft 54, are secured to the sprocket wheels 60 in any suitable manner at 62. FIG. 3 illustrates the weighted drop box 20 in its raised or uppermost position.

A coil spring 63 is wound around the auxiliary shaft 61 between the inner faces of the sprocket wheels 60 with one end secured to the inner face of one of the sprocket wheels and the other end adapted to bear against a stationary part of the vehicle frame so as to impose a continued resistance to the counterclockwise turning of sprocket wheels 60 and shaft 61. This arrangement keeps the lift chains 58 taut during the dropping or lifting action of the weighted drop box 20.

A stationary rock shaft 64 is rigidly mounted in suitable brackets secured to the vehicle frame and extending transversely to and in parallel relationship with power drive shaft 28 and the portions 34 and 35 of the split shaft as shown in FIG. 2 to support a pair of bell crank levers 65 and 66 in pivoted relationship thereon. The upper arm of the bell crank 65 supports a roller 67 and its lower arm is attached by means of a clevis to one end of a pull rod 68. The other or forward end of the pull rod is attached in a similar manner to the depending end of the aerator operating control lever 69 which is mounted on the forward portion of the vehicle frame and is provided with a cam or ratchet and pawl device which acts to hold or lock the lever in the desired operating position.

The lower arm of the bell crank 66 supports a roller 70 and its upper arm is attached by means of a clevis to one end of a pull rod 71. The other or forward end of pull rod is attached in a similar manner to the depending end of the transport control lever 45 shown in FIG. 1 mounted on the vehicle frame and is also provided with a cam or ratchet and pawl device for locking the lever in the desired operating position. The rollers 67 and 71 are adapted to contact and apply pressure to either of the V-belts 30' or 31' to selectively act as a belt tightener on the normally loose belts when either the transport control lever 45 or the aerator operating lever 69 are manually pulled rearwardly. This action of levers 45 and 69 causes either the pull rods 68 or 71 to rotate one or the other bell crank levers 65 or 66, thereby causing the roller 67 or 70 to contact and apply pressure to one of the V-belts 30' or 31' to activate that portion of the power train which is associated with the ground wheels 22 and 23 to transport the entire vehicle or to activate that portion of the power train which is associated with the various operating components of the deep-tine aerating machine of this invention in a selective manner. Split tine assemblies 72 are rigidly attached in depending relationship from the bottom of drop box 20. Drop box 20 consists of a rectangular shaped box-like structure having an open interior which is substantially enclosed by the top cover plate 59. The thick bottom plate 73, side walls 74 and 75, rear panel 76 and front panel 77 are secured together to form a contiguous unit. The top cover plate 59 to which the pair of lift chains 58 are attached (as previously mentioned) is provided with a plurality of drilled holes 78 which extend through the plate and may be equally spaced from each other in both transverse and longitudinal directions to form a rectangular pattern of 18 holes spaced approximately four inches apart in both directions.

Figure 7:
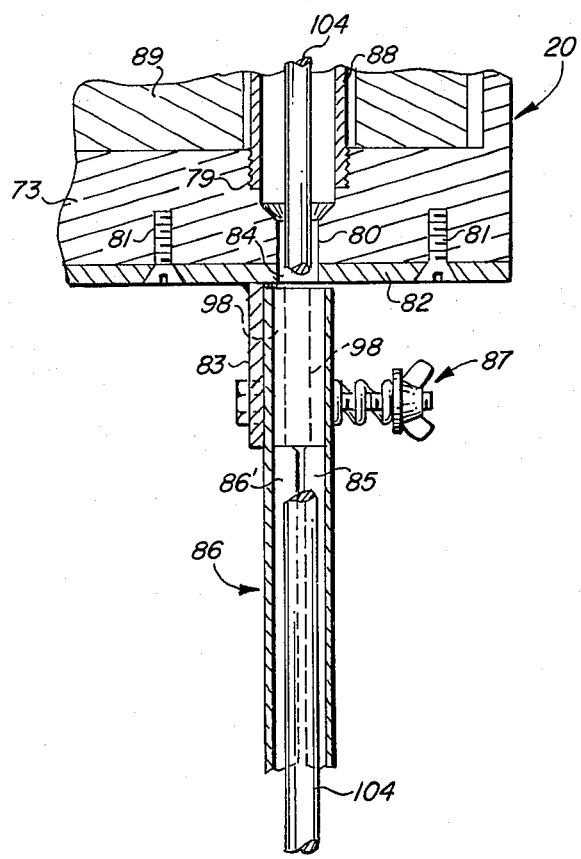
FIG. 7 is a fragmentary vertical sectional view taken on the line 7—7 of FIG. 6 showing the hollow tapered interior or bore of the assembled split tine, its relation to push rods which function therein and one means of attaching the assembled tines to the underside of the weighted drop box.

Bottom plate 73 is provided with a like number of tapped holes 79 which are in accurate parallel and vertical alignment with the drilled holes 78 in the cover plate 59. These tapped holes extend only part way down into the bottom plate and communicate with smaller diameter drilled holes 80. Holes 80 extend therethrough as shown in FIG. 7. Bottom plate 73 is also provided with a plurality of tapped holes on its underside which are adapted to receive a like number of machine screws 81 that are used to support an auxiliary removable bottom plate 82 in direct contact with the bottom surface of the drop box 20.

Figure 6:
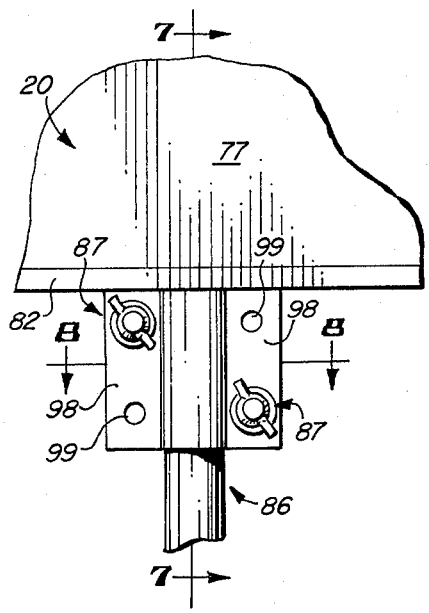
FIG. 6 is a fragmentary rear elevational view illustrating one method of attaching the two-piece split tines of this invention to the underside of the weighted drop box.
Figure 8:
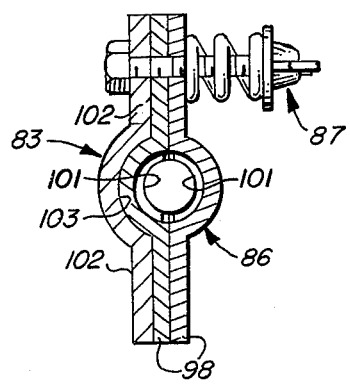
FIG. 8 is a transverse sectional view taken on the line 8—8 of FIGS. 6 and 7 illustrating the preferred method of attaching the two-piece split tines to depending brackets on the underside of the weighted drop box and the respective relationship of the push rods within the hollow interior of the split tines.

The removable bottom plate 82 is provided with a plurality of depending tine support members or brackets 83 which are secured to the underside of plate 82 with the vertical center of their central concave areas directly behind and in parallel alignment with the centers of a like number of drilled vertical holes 84. Holes 84 communicate with the drilled holes 80 in the bottom plate 73 of the drop box a sufficient distance to allow the hollow interiors or tapered bores 85 of a like number of assembled split tines 86 to communicate in vertical relationship with the centers of the drilled holes 84 and 80, the tapped holes 79 in bottom plate 73 and the auxiliary removable bottom plate 82 of the drop box 20 when the split tine assemblies are removably attached to the depending tine support brackets 83 by bolt, spring and wing-nut assemblies 87, as shown in FIGS. 6, 7 and 8 of the drawings.

A plurality of tubular sleeve members 88, each of which has a male threaded portion at one end, are screwed (one each) into the female tapped holes 79 in base plate 73 of the drop box and project upwardly and vertically therefrom some distance above the top edges of the walls of the drop box. In this position they are maintained as a removable weight member 89 which is provided with a like number of vertical clearance holes sized and adapted to slide down over the sleeve members 88 into the open rectangular area of the drop box 20 to provide for continual vertical alignment of the sleeve members. Member 89 also provides any additional weight that might be required in the drop box. After installation of the tubular sleeve members 88 and the removable weight member 89 in the drop box, the top cover plate 59 is positioned over the sleeves and secured to the vertical walls of the drop box.

The thick bottom plate 73 of the drop box 20 is provided with a pair of integral lateral extensions 90 which extend horizontally through its side walls 74 and 75 at each side of the box a sufficient distance to enter the open inside portions of the vertical channel members 16 and 17 as shown in FIG. 2. These extensions are a rigid part of the vehicle frame 11 and act as guides for the reciprocating drop box 20 during its down and upward vertical movement to keep the same level at all times.

To prevent accidental dropping of the heavy weighted drop box 20, the aerating device 10 is provided with a weight holding and releasing device which consists of an operating lever 91 which is mounted on a transverse rotatable shaft 95. Shaft 95 extends across and is secured to the vehicle frame closely adjacent the vertical channel members 16 and 17, the sides of which are provided with opposed rectangular cutouts 93 that are each adapted to receive horizontally slidable hold bars 93 at each side of the frame. These bars are connected and activated by suitable linkage 44 at each side of the frame which in turn is fixed to the rotatable transverse shaft 95. The rectangular cutouts 92 are located vertically just slightly below the bottom surfaces of the lateral extensions 90 so that when the weighted drop box 20 is in its uppermost position the slidable hold bars 93 may be easily moved horizontally into the cutouts. Their top edges are then directly below the underside surfaces of the lateral extensions 90 to thereby support and prevent accidental dropping of the heavy weighted drop box when the aerating machine is being serviced or transported on the vehicle.

The two-piece, tapered, split tine assemblies 86 used in association with other components of the aerating device 10 to perform the aerating function are comprised of two identical portions 96, each of which consists of a long tapered semi-circular shank portion 97 having integral laterally extending flat mounting flanges 98 at its upper end. These flanges are provided with two mounting holes 99 on each side of the semi-circular formed shank. A sharp pointed end portion 11 is provided at one end of portion 96, the radius of which is smaller than the radius of the upper portion of the shank. Each of the flat side edges of the tapered shank are milled out to provide a relief which extends upwardly in tapered relationship from the pointed end portion 100 to the bottom edges of the mounting flanges 98. These reliefs form a pair of gradually increasing slots or splints 101 in the opposed sides of the assembled split tines shank portion when one of the identical half portions 96 is superimposed on the other half portion to form the assembled split tine 86.

The above described split tines in their assembled form are securely attached one each to the plurality of tine support members or brackets 83 which are rigidly secured and depend from the removable bottom plate 82 of the weighted drop box 20. Brackets 83 have similar flat mounting flanges 102 defining concave central portion 103 with two mounting holes in each flange for aligning with the mounting holes 99 in flanges 98 of the tines. The concave central portions 103 have reversed contours similar to one of the identical half portions 96 of the tines and is adapted to receive and securely hold and support the upper flanged portion of the assembled split tines 86 in direct mating contact with the rear faces of the brackets 83 by the bolt, spring and wing nut assemblies 87.

When the assembled split tines 86 are securely mounted one each on the plurality of depending brackets 83, their long depending tapered shank portions 97 point downwardly toward the ground surface. Thus, there is provided a plurality of vertically arranged passageways or bores which include the hollow tapered interiors 85 of the assembled split tines 86, the drilled holes 84 and 80 in the bottom plates 82 and 73 of the drop box 20 and the bores of the tubular sleeve members 88 which extend from the lower ends of the assembled split tines up to and through the upper ends of the sleeve members 88.

The communicating vertical passageways thus formed provide a channel means for the up and down reciprocating movement of the heavy weighted drop box 20 with its attached split tines 86 and tubular sleeve members 88 to allow entry of a like number of stationary depending cleaning rod members 104. Cleaning rod members 104 are supported at their upper ends by a stationary extension 105 of the vehicle frame as by washers and cotter pins 106 placed over the cleaning rods both above and below the frame extension 105 with some vertical clearance therebetween to allow for a slight vertical movement of the rods, thereby preventing possible distortion or bending of the rods when in use.

Figure 5:
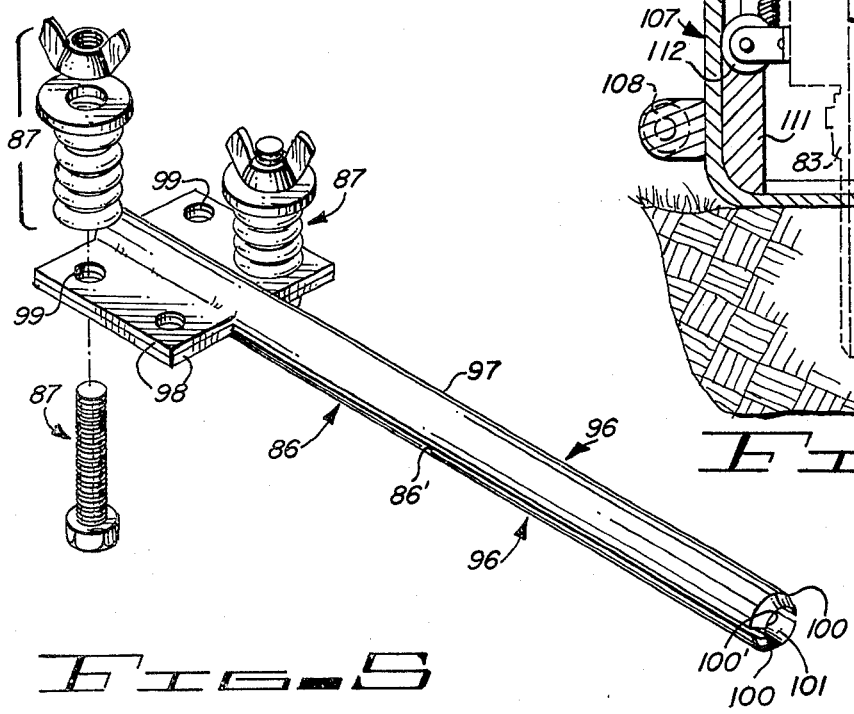
FIG. 5 is a perspective view of one assembled two-piece split tine, a plurality of which are used in association with other components of the deep-tine aerating device of this invention, with some of its attaching components shown in exploded relationship.

When the weighted drop box 20 with its attached deep split tines 86 is in its raised or uppermost position, as shown in FIG. 5, the cleaning rods 104 project downwardly through the communicating bores and the hollow tapered interiors of the split tines to a point somewhat below their open ends. The diameter of the cleaning rods is large enough to closely fit the inside diameter of said open ends of the split tine so as to completely remove all the soil that is picked up by the tines during the upward stroke thereof.

The deep tine aerating device 10 is also provided with a heavy hold-down member or assembly 107 which consists of a transverse cross bar 108 which extends across the vehicle frame and is supported at its outer ends in pivoted relationship in suitable bearing holes in the frame by washers and cotter pins and the like as indicated at 109 in FIG. 2. A specific number of heavy L-shaped channel members 110 are secured to the rear side of the transverse cross bar 108 with their rearwardly projecting leg portions spaced and located so as to lie flat on the ground surface one leg between each longitudinal row of tines to aid in preventing severe rupture of the turf and ground surface when the tines are penetrating or being removed from the same.

Figure 4:
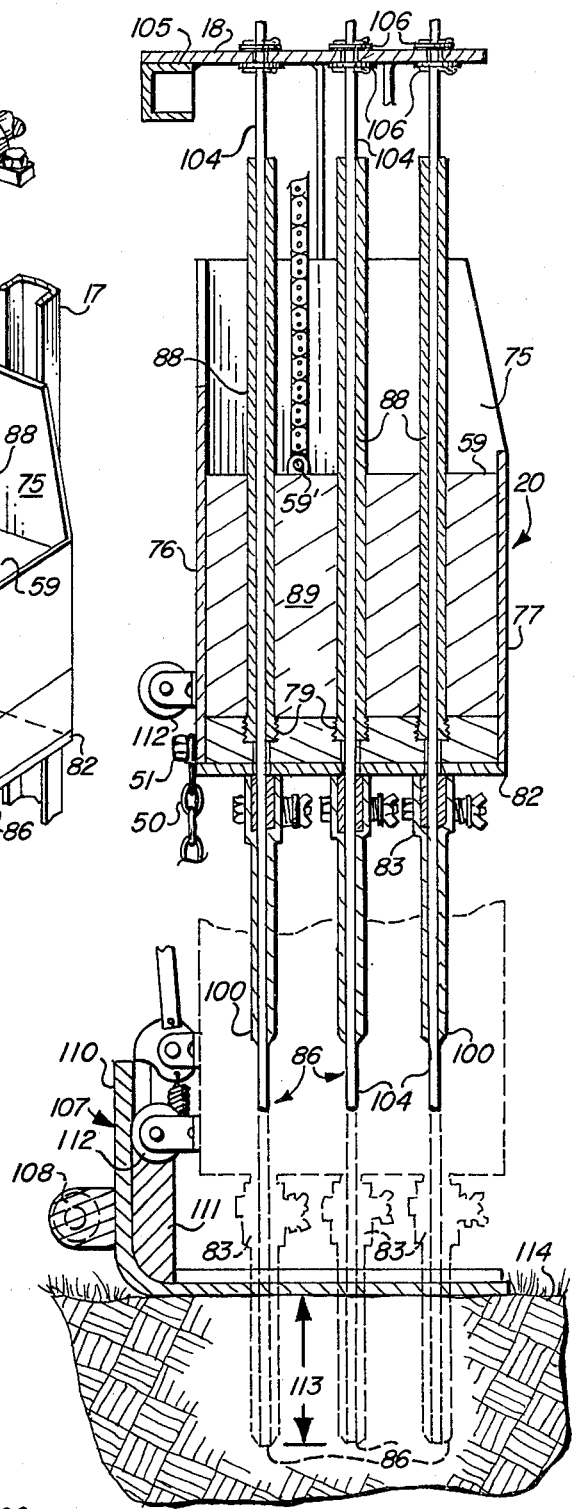
FIG. 4 is a vertical sectional view taken along the line 4—4 of FIG. 3 through the weighted drop box and illustrating a portion of the soil directly below the drop box together with the split tines and hold down member in full lines in raised position and in dash lines in lowered or dropped position.

At least two of the L-shaped channel members 110, preferably those at the outer ends of the hold down assembly, are provided with flexible rubber blocks 111 which are secured to the inner rear surface of the upwardly projecting channel legs. These rubber blocks are adapted to be contacted by a pair of vertically aligned rollers 112 which are secured to the rear panel 76 of the drop box 20 in vertical alignment with the flexible rubber blocks to act as resilient shock absorbers for the components of the heavy drop box 20 and as a limiting means to control the distance 113 that the split tines 86 may penetrate the soil 114 being aerated. These L-shaped channel members 110 are locked in the hold-down position until the tines are completely out of the ground, and then float above the ground a given distance until the next ground penetrating action of the tines at which time they again are moved in contact with the ground and locked. This locking means may comprise a suitable lever and catch arrangement (shown in FIG. 4) actuated in a known manner by the movement of the tines.

DESCRIPTION OF OPERATION

After making sure that the weighted drop box 20 with its attached split tines 86 has been raised to its uppermost position and locked therein by hold bars 93 upon manual radial movement of operating lever 91, and wheel brakes 44' have been released by manual radial movement of the brake control lever 44, the power driven vehicle 12 on which the deep-tine aerating device is mounted is then driven by the operator to the desired location where the machine is to be utilized to perform its aerating function.

It should be understood that the gas engine or motor 26 through the clutch member 27 and the drive shaft 28 provides the necessary power to transport the vehicle or to operate the aerating machine and that either function may be accomplished by the manipulation of the transport control lever 45 or the aerator operating lever 60 in the following manner: with the engine 26 running and the clutch 27 engaged, thus causing forced rotation of the drive shaft 28 in a counterclockwise direction, the operator may pull back on the transport control lever 45, causing the pull rod 71 attached to its lower end and to the upper arm of the bell crank lever 66 to rotate the bell crank about the stationary rock shaft 64. This action causes the roller 70 pivoted on the lower arm of the bell crank lever to contact and apply sufficient pressure to the V-belt 31 to tighten the normally loose belt. Then through the associated components of the power train including pulleys 31 and 33, half portion 35 of the split intermediate shaft, sprocket wheel 35, chain 37, sprocket wheel 38, differential gearing arrangement 41, sprocket wheels 42, drive chains 43 and the sprocket wheels 25 fixed to the rotatable stub axle shafts 24 of the driven ground wheels 22 and 23, the vehicle is moved forward over the ground surface to provide transportation for the aerating machine 10 to any desired location. It should be understood that reversed movement of the vehicle can be accomplished by reversing the rotation of the drive shaft 28 through a simple transmission installed ahead of the clutch member 27 but not shown in the drawings.

After having driven the vehicle with the aerating device mounted thereon to the area to be aerated, the operator releases the transport lever 45, thereby causing all of the components of the driving power train described above to become motionless by releasing the pressure of roller 70 on V-belt 31. The belt is loose or in slipping relationship with pulleys 31 and 33 and at the same time permits the drive shaft 28 to continue its rotation. The operator then applies brakes 44' to the ground wheels to prevent any movement of the vehicle and the aerating machine.

After the machine has been properly positioned on the golf course green or other lawn area, the aerating process can then begin. This is accomplished in the following manner: the heavy weighted drop box 20 with its plurality of assembled, two-piece split tines rigidly attached to its underside is allowed to drop straight down in vertical parallel relationship guided by the projecting lateral extensions 90 which move down and up with the drop box in the vertical channel members 16 and 17 of the frame immediately upon withdrawal of the slidable hold bars 93 from under the lateral extensions 90 by the simple manipulation of the operating lever 91 by the operator.

The heavy, weighted drop box, when allowed to drop, causes the sharp pointed ends 100 and the tapered shanks 97 of the plurality of split tines 86 to penetrate the soil directly below each tine a distance of about 4 inches. They are prevented from further penetrating the soil by the flexible rubber blocks 111 in the L-shaped end channel members 110 when they are contacted and slightly compressed by the vertically aligned rollers 112. The flexible rubber blocks 111 act as a snubber to dampen the vibration of the attendant shock on the various components of the machine and limit the distance of penetration 113 of the tines in addition to holding down the soil in the near area of the penetrating tines.

As the split tines penetrate the soil, they pick up most of the soil from the resulting formed apertures and contain this soil in their hollow tapered interiors 85. This contained soil is subsequently extracted from the interiors of the split tines by the stationary depending cleaning rods 104 which force the soil from the interiors of the split tines as the weighted drop box 20 and the attached tines are lifted from the formed apertures in the soil 114 and distributed over the area being processed.

When the weighted drop box 20 and its associated split tines are dropped to the ground the cleaning rods 104 move out of the hollow interior of the tines so that when their sharp pointed ends 100 enter the surface of the soil, their ends are open and their hollow interiors are unrestricted, causing the soil to enter with ease.

At the same time that this dropping procedure is taking place, link chain 50 becomes slack and allows the entire ratchet device assembly to drop down by rotating about its points of support and pivot 49. This action causes the pivoted pawl member 47 to ride freely over the tops of the deep teeth of the sprocket wheel 46 until it assumes a straight down vertical position in alignment with the center line of shafts 39 and 40 with its pawl member 47 lightly spring pressed against the teeth of the sprocket wheel 46. The pawl member remains here locked between the teeth until released by the action of cam lever 47' manipulated manually by the operator to perform a specific function during the process of raising or lifting the weighted drop box and the split tines to their uppermost position ready to complete another cycle of the operation. In order to raise the weighted drop box 20 and its associated split tines 86 from the soil 114 to their original starting or uppermost position, the operator need only to pull back on the aerator operating lever 69. This action causes the pull rod 68 attached at one end to the depending end of the operating lever 69 and at its other end to the lower arm of the bell crank lever 65, to rotate the bell crank about the stationary rock shaft 64 and apply pressure by roller 67 pivoted on the upper arm of the bell crank to tighten the normally loose V-belt 30'. The rotational movement of the drive shaft 28 then drives the half portion 34 of the split intermediate shaft through pulley 30, V-belt 30', pulley 32 and sprocket wheel 52 in a counterclockwise direction to rotate the sprocket wheel 53 in the same direction by drive chain 55.

Counterclockwise rotation of sprocket wheel 53 fixed to one end of the transverse rotatable shaft 54 causes the identical sprocket wheels 57 fixed to shaft 54 to be rotated in the same direction. This action causes the pair of lift chains 58 which are securely attached at their bottom ends to the top cover plate 59 of the drop box 20 to ride over the sprocket wheels 57 and to be wound around the pair of sprocket wheels 60 a distance equal to a greater part of their circumference. The continued upward pull of the pair of lift chains 58 raises the weighted drop box 20 with its associated split tines 86 in a constantly level manner to its uppermost position where it is retained in said position by hold bars 93 slid under the lateral extensions 90 extending from the sides of the bottom plate 73 of the drop box. It should be noted that the pair of lift chains 58 are kept taut at all times by the action of coil spring 63 surrounding shaft 61 between the sprocket wheels 60 which is attached at one end to one of the sprocket wheels and at its other end to some stationary portion of the frame so as to apply a continual winding up tension on the chains, which tension is greatly increased when the weighted box is dropped.

Previous to the activation of the power train to raise the heavy drop box and its associated split tines from the soil, the operator adjusts cam lever 47' which locks the pivoted pawl member 47 against pivotal movement in the ratchet device assembly 48. At this time the link chain 50 which supports the ratchet device assembly 48 when the weighted drop box 20 is in its raised position becomes slack when the weighted box is dropped, allowing the ratchet device assembly 48 to pivot about shafts 39 and 40 and assume a vertical position directly under the center of the sprocket wheel 46. At this time, pawl member 47 is made rigid by the adjustment of cam lever 47', thereby locking it in position with its rounded end portion between the lowermost teeth of the sprocket wheel 46 so that when the weighted drop box is raised and the attached link chain 50 gradually pulled taut, it pulls up on the ratchet device assembly 48, causing upward radial movement of the same about its pivot points on the shafts 39 and 40. This action results in the forced rotation of the sprocket wheel 46 by pawl member 47 and the consequent rotation of the other components of the ground wheel driving power train to cause the vehicle 12 and the aerating machine 10 to be moved forward a specific distance. The distance moved is precisely determined by the length of chain 50 and the ratios between the other driving components.

When the drop box 20 and its associated split tines 86 are lifted from the soil, they leave a rectangular pattern of clean-cut, deep apertures in the soil which are spaced both transversely and longitudinally an equal distance apart (approximately 4 inches) so that as the vehicle and the aerating device is moved forward during the lifting operation, it will not start to move before the tines have been lifted from the surface of the soil and turf. It will then move only a specific distance to allow for the next rectangular pattern of apertures to be spaced exactly the same longitudinal distance from the first pattern and so on, until the entire area of the green or lawn being aerated is covered with equally spaced deep apertures. The loose soil extracted from the apertures is distributed over the entire area of the green or lawn.

The extraction and distribution of the soil is accomplished in the following manner: As the deep split tine assemblies 86 penetrate the turf and soil of the green or lawn, their tapered semi-circular shank portions 97 are forced closer together to form a perfect circular opening 100' at their sharp pointed end portions 100 so that the soil offers little resistance to the penetration of the two-piece tapered shank. The tines each pick up a quantity of soil through their circular openings 100' which is temporarily contained in the hollow interior 85 of the split tine. This soil is subsequently excreted from the same as the tines are lifted from and above the soil by drop box 20 and its associated stationary depending cleaning rods 104. As the tines are raised the bottom ends of the cleaning rods contact the soil contained in the hollow interiors of the two-piece split tines and force the soil from the openings 100' at the bottom end of said tines. This soil is loosely distributed over the area of the green or lawn being aerated.

It should be noted that if the soil picked up and contained in the hollow interiors 85 of the tines is of a very dense nature or easily compacted by the cleaning rods 194 as to block the outlet openings 100', the pressure exerted on the two identical half portions 96 of the tapered split tines would cause the two halves to spread apart against the pressure of the compression springs in the bolt, spring and wing nut assemblies 87 to permit the compacted soil to escape therefrom.

As mentioned heretofore, the L-shaped channel members 110 are locked in the hold-down position until the tines are pulled back out of the ground and then float above the ground a given distance until the next ground penetrating action of the tines, at which time these members are again locked in ground engaging position.

Although but one embodiment of the invention has been shown and described, it will be apparent to those skilled in the art that various changes and modifications may be made therein without departing from the spirit of the invention or from the scope of the appended claims.

What is claimed is:

1. A tine for penetrating turf comprising:
    a pair of matching semi-circular concave elongated members which, when juxtapositioned to each other with their concave surfaces facing each other, form a hollow passageway axially therethrough,
    said members being tapered along at least a part of their lengths toward one common end to aid in penetrating the turf, and
tension means attached to said members for biasing them into matching engagement with each other,
    said means permitting said members to spread apart a limited amount under penetrating and withdrawl pressures exerted on the tine when used in aerating turf.

2. The tine set forth in claim 1 wherein: said hollow passageway tapering along its length toward said one common end.

3. The tine set forth in claim 1 wherein: said members taper along their full length toward said one common end.

4. The tine set forth in claim 1 wherein:
    each member is provided with a flange at its other end for engaging with the similar flange on the other member, and
    said means for biasing said members together is mounted on said flanges of said members.

5. The tine set forth in claim 4 wherein:
    said means comprises a tension spring arranged to bias said members toward each other.

* * * * *